United States Patent
Grupp (10) Patent No.: US 6,753,937 B2
(45) Date of Patent: Jun. 22, 2004

(54) REFLECTIVE LIQUID CRYSTAL DISPLAY DEVICE HAVING A BLACK ABSORBENT LAYER

(75) Inventor: Joachim Grupp, Enges (CH)

(73) Assignee: Asulab S.A., Marin (CH)

( * ) Notice: Subject to any disclaimer, the term of this patent is extended or adjusted under 35 U.S.C. 154(b) by 166 days.

(21) Appl. No.: 09/985,252

(22) Filed: Nov. 2, 2001

(65) Prior Publication Data

US 2002/0089625 A1 Jul. 11, 2002

(30) Foreign Application Priority Data

Nov. 27, 2000 (CH) ............................................. 2298/00

(51) Int. Cl.⁷ ............................................. G02F 1/1333
(52) U.S. Cl. ..................... 349/110; 349/113; 349/86; 430/20
(58) Field of Search ................................ 349/113, 110, 349/86; 430/20

(56) References Cited

U.S. PATENT DOCUMENTS

| | | | |
|---|---|---|---|
| 3,734,597 A | * 5/1973 | Churchill et al. | ............ 350/160 |
| 4,963,788 A | * 10/1990 | King et al. | ............ 315/503 |
| 5,773,179 A | * 6/1998 | Mehl et al. | ............ 430/20 |
| 5,990,995 A | * 11/1999 | Ebihara et al. | ............ 349/113 |
| 6,005,651 A | 12/1999 | Takahara et al. | |
| 6,124,908 A | 9/2000 | Kobayashi et al. | |
| 6,396,621 B1 | * 5/2002 | Sheridon | ............ 359/296 |

FOREIGN PATENT DOCUMENTS

| | | | |
|---|---|---|---|
| GB | 002121443 | * | 12/1983 |
| JP | 363312601 | * | 12/1988 |
| JP | 407049485 A | * | 2/1995 |
| WO | 95 07494 | | 3/1995 |

OTHER PUBLICATIONS

Patent Abstracts of Japan vol. 011, No. 223 (P–597), Jul. 21, 1987 & JP 62 040430 Feb. 21, 1987.

* cited by examiner

*Primary Examiner*—Huyen Ngo
(74) *Attorney, Agent, or Firm*—Sughrue Mion, PLLC (57) ABSTRACT

A liquid crystal display device including a first substrate arranged on a front side, i.e., arranged on the side receiving an incident light, and a second substrate arranged on a back side, so that this second substrate extends facing the front substrate parallel thereto, the first and second substrates being connected via a sealing frame in order to delimit between them a cavity for containing the liquid crystals and including on their opposite faces a first and a second group of electrodes, respectively. The display device is connected to a control circuit for supplying suitable control voltages to selected electrodes in order to modify the optical conditions of the liquid crystal into a reflective state or into a transparent state. The display device further includes an absorbent black layer made of an electrically non-conductive material, wherein the absorbent black layer is arranged either at the surface of the second substrate or on the second group of electrodes that is formed on the second substrate.

22 Claims, 4 Drawing Sheets

REFLECTIVE LIQUID CRYSTAL DISPLAY DEVICE HAVING A BLACK ABSORBENT LAYER

BACKGROUND OF THE INVENTION

The present invention concerns a reflective liquid crystal display device in particular with improved display contrast allowing the displayed characters to contrast clearly with the background on which they are displayed.

There exist different types of reflective liquid crystal display devices. One may, in particular, cite transmissive display devices including a metal or dielectric reflector placed behind the display cell.

A transmissive display device conventionally includes an absorbent polariser placed in front of the cell, and a second absorbent polariser placed behind the cell and whose direction of polarisation is perpendicular to that of the first absorbent polariser placed in front of the cell. Such is the case, in particular, of twist nematic or TN liquid crystal cells. A first linear component of the light is absorbed by the absorbent polariser placed in front of the cell, i.e. on the side receiving the incident light, while the second light component, perpendicular to the first, is transmitted to the TN cell. In the TN cell, the direction of polarisation of the transmitted light is rotated through 90°, so that this light is transmitted without modification by the second absorbent polariser, and is visible to an observer placed behind the cell. In the zones where a control voltage is applied in order to modify the optical conditions of the twist nematic liquid crystal, the light transmitted by the absorbent polariser placed in front of the cell passes through said cell without being modified by the TN liquid crystal and is absorbed by the second absorbent polariser placed behind the cell. The observer, placed behind the cell, thus sees characters displaced in black on a white background.

In order to transform a transmissive cell into a reflective cell, as mentioned above, one need only arrange a metal or dielectric reflector behind said transmissive cell. Thus, in the event chat the display cell is a TN liquid crystal cell, the linear component of the light transmitted to the TN cell by the absorbent polariser placed in front of said cell is rotated through 90° by the liquid crystal, then transmitted without modification by the second absorbent polariser placed behind the TN cell whose direction of polarisation is perpendicular to that of the first absorbent polariser, then finally reflected by the reflector. The light then follows the same path, but in the opposite direction, through the cell and the absorbent polarisers, and is visible to an observer placed in front of said cell, i.e. on the side through which the incident light penetrates.

There also exist reflective liquid crystal cells without any polarisers. This is the case, for example, of polymer stabilised cholesteric texture or "PSCT" liquid crystal cells.

It will be recalled that the characteristic of certain cholesteric type liquid crystals is having a periodic twisted structure which reflects, by Bragg reflection, light which has circular polarisation in the same rotational direction as that of the liquid crystal. Thus, a cholesteric liquid crystal having a right handed helix will reflect light circularly polarised to the right, whereas it will allow light circularly polarised to the left pass without modification. Conversely, a cholesteric crystal having a left handed helix will reflect light circularly polarised to the left.

Display cells without any polarisers which use reflective liquid crystals such as cholesteric liquid crystals require the use of an absorbent black layer conventionally deposited on the back face of the cell. When a suitable control voltage is applied to selected electrodes to modify the optical conditions of the liquid crystal located at the crossing point of the electrodes in question, this control voltage switches the liquid crystal into a state in which it is reflective or into a state in which it is transparent. In the state in which it is reflective, the cholesteric liquid crystal has a reflection coefficient substantially equal to 0.5 when the light of a polarisation is reflected, and when the light from the other polarisation passes and is absorbed by the absorbent layer. When the control voltage is applied, the liquid crystal switches into the state in which it is transparent and allows practically all the light which is absorbed by the black layer located on the back face of the cell to pass. The observer situated on the front side of the cell, i.e. on the side through which the incident light penetrates the cell, thus sees a dark display on a light background.

The deposition of the absorbent black layer on the back face of the reflective cells poses problems during the manufacturing of such cells. Indeed, as is known, liquid crystal cells are usually manufactured collectively in batches. These batches include two plates common to all the cells and a network of sealing material connecting the plates and forming the walls of said cells, these walls delimiting cavities intended to be filled with liquid crystal. Each batch is divided into rectilinear strips by glass scratching and breaking techniques, or by sawing along parallel straight lines. As each cell has a filling opening along one edge of strip, the cells are then filled and their openings are sealed, then the strip is divided into individual rectangular cells along straight lines perpendicular to the preceding lines. At this stage, if the contour of the cells has parts deviating from the rectangular shape, such parts are shaped by grinding.

The absorbent black layer is applied over one of the two plates common to all the cells before the batches of cells are divided into individual cells. This absorbent black layer may nonetheless not cover the entire surface of the corresponding plate, since it would be damaged and would disturb the cutting and grinding operations. This manufacturing step could also be effected individually on each cell, but that would make manufacturing more complex and expensive than if it could be performed on a batch of cells. It is for these reasons that the technique currently used consists in selectively depositing absorbent black layers on one of the common plates following, for each cell, the final contour thereof. This solution, which is simpler than if the absorbent layer had to be individually deposited on each cell, remains however complex and requires a high level of precision to execute, which inevitably makes the final cost price of the cells more expensive.

Another recurrent problem encountered with reflective cells concerns the optical losses due to the multiple reflections of the incident light at each interface between two materials of different optical indices. This problem will be better understood upon examining FIG. 1 annexed to the present Patent Application which is a cross-section of a reflective display device according to the prior art.

Figure 1:
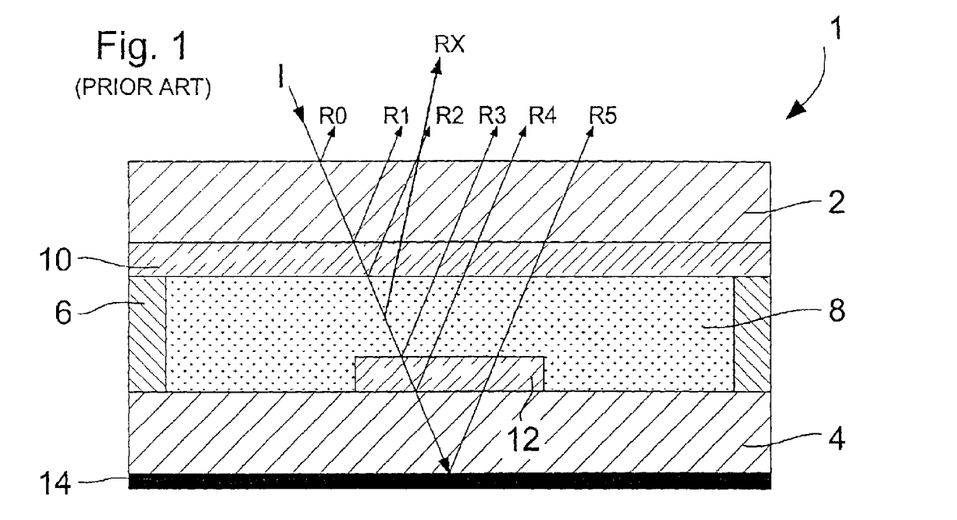
FIG. 1, which has already been cited, is a cross-section of a display device of the prior art wherein the absorbent black layer made of an electrically non-conductive material is deposited on the outer surface of the back substrate.

Designated as a whole by the general reference numeral 1, the aforementioned reflective display device includes a first transparent substrate 2 arranged on a front side, i.e. on the side which receives incident light, and a second substrate 4 arranged on a back side, so that substrate 4 extends facing front substrate 2 and parallel thereto.

Substrates 2 and 4 may be made of glass or a plastic material. They are connected via a sealing frame 6 in order to limit between them a cavity for containing a film or layer 8 of reflective liquid crystals, for example of the cholesteric type.

The surface of substrate 2 turned towards substrate 4 carries a first group of electrodes 10. The surface of substrate 4 turned towards substrate 2 includes a second group of electrodes 12 arranged, for example, in the form of strips perpendicular to electrodes 10. Each of electrodes 10 and 12 may be formed by a conductive strip deposited and structured by conventional techniques and made, for example, of indium-tin oxide (ITO). The display device is connected to a control circuit for electrodes 10 and 12, this circuit supplying control voltages to the electrodes to switch the liquid crystal into a state in which it is reflective or into a state in which it is transparent. Finally, the outer face of back substrate 4 is coated with an absorbent black layer 14.

As can be seen in FIG. 1, the incident light whose intensity is designated by the alphabetical reference I is partially reflected at each interface between two mediums of different optical indices. Thus, the following references will successively be used:

R0 designates the intensity of the light reflected by the external surface of front substrate 2;

R1 designates the intensity of the light reflected at the interface between the back face of front substrate 2 and the first electrode group 10 deposited on this surface;

R2 designates the intensity of the light which is reflected at the interface between the first electrode group 10 and liquid crystal layer 8;

R3 designates the intensity of the light which is reflected at the interface between liquid crystal layer 8 and second electrode group 12;

R4 designates the quantity of light reflected at the interface between second electrode group 12 and the front face of back substrate 4 on which said second electrode group 12 is deposited; and R5 designates the quantity of light reflected at the interface between the back face of back substrate 4 and absorbent black layer 14 deposited on this back face of said second substrate.

Finally, Rx designates the quantity of light reflected by cholesteric liquid crystal 8.

In order to give an order of magnitude, and ignoring the multiple internal reflections, it is estimated that the reflection intensity R0 represents approximately 4% of the total intensity I of the incident light, that reflections R1, R2, R3 and R4 each represent approximately from 1 to 2% of the total quantity of incident light 1, and that R5 is of the order of 1% of incident light 1. One thus reaches, for reflections R0 to R5, a total of the order of 10% of the quantity of incident light 1, which is far from negligible and leads to an alteration in the luminosity of the characters displayed by display device 1.

Reflections R0, R1, R2, R3, R4 and R5 also have the effect of reducing the display contrast CR. Indeed, display contrast CR is defined as the ratio between the reflectivity R of display device 1 when liquid crystal 8 is switched into the state where it reflects the incident light, and the reflectivity r of display device 1 when liquid crystal 8 is switched into the stage where it is substantially transparent. Reflectivity R is the sum of reflections R0 to R5 increased by the quantity of light Rx=RB reflected by cholesteric liquid crystal 8 when the latter is in the reflective state, and reflectivity r is the sum of reflections R0 to R5 increased by the quantity of light Rx=RS reflected by cholesteric liquid crystal 8 when it is in the transparent state where it allows substantially all the light to pass. Consequently, display contrast CR is determined at a first approximation by the following ratio:

$$CR = \frac{R}{r} = \frac{RB + R0 + R1 + R2 + R3 + R4 + R5}{RS + R0 + R1 + R2 + R3 + R4 + R5}$$

As will easily be understood, the value of display contrast CR is greater, and consequently the characters displayed by display device 1 are better contrasted, the smaller the reflectivity r of said display device 1 in the dark state, i.e. in the state in which cholesteric liquid crystal 8 is practically transparent and only reflects a small amount of light. As a general rule, the quantity of light RS reflected by cholesteric liquid crystal 8 in the transparent state, cannot be reduced by much. However, one can try to reduce reflections R0 to R5 by arranging, at each interface between two mediums of different optical indices, anti-reflecton layers. However, these anti-reflecton layers are usually very expensive and considerably complicate the manufacturing process of the display cells. This is why such anti-reflecton layers are mostly not used and it is accepted that display devices with a mediocre display contrast are put on the market.

BRIEF SUMMARY OF THE INVENTION

The main object of the present invention is to overcome the aforementioned drawbacks, in addition to others, by providing a reflective liquid crystal display device allowing the display of contrasting data which is simple and thus less expensive to manufacture.

According to a first aspect, the present invention therefore concerns a liquid crystal display device including a substrate arranged on a front side, i.e. arranged on the side receiving an incident light, and a second substrate arranged on a back side, so that this second substrate extends facing the front substrate parallel thereto, the first and second substrates being connected via a sealing frame in order to delimit between them a cavity for containing the liquid crystals and including on their opposite faces a first and a second group of electrodes respectively, the display device being connected to a control circuit for the electrodes, this circuit being able to supply suitable control voltages to selected electrodes in order to modify the optical conditions of the liquid crystal at the crossing point of the electrodes in question, i.e. to switch the liquid crystal into a state in which it is reflective or into a state in which it is transparent, said display device further including an absorbent black layer made of an electrically non-conductive material, characterised in that the absorbent layer is arranged at the same level or at a higher level in the stacking order of the substrates than the face of the back substrate which carries the second group of electrodes.

Owing to these features, the present invention provides a display device wherein the quantity of light reflected by parasit reflections is reduced, which allows the display contrast to be substantially improved. Moreover, one is no longer obliged, in order to be able then to scratch the glass during the step of cutting out the display cells, to deposit selectively the absorbent black layer, which simplifies the manufacturing operations and thus contributes to a reduce in the cost price.

According to a complementary feature of the invention, the second group of electrodes is made of a black-coloured electrically conductive material, and is associated with an absorbent layer which is also black and made of an electrically non-conductive material whose reflection coefficient is close or equal to that of the material used to elaborate the electrodes, this layer covering at least the parts which are not covered by the electrodes.

In this way, in the zones where the liquid crystal is switched into the same transparent or reflective state, the light will be absorbed or reflected in an almost identical manner by the black layer and by the electrodes, and will thus provide a very homogenous colour display over the entire surface of said display device. An optimum display contrast is also obtained.

More precisely, by using a black electrode, the parasite reflections which are usually generated at the interface between the liquid crystal layer and the second group of electrodes on the one hand, and at the interface between this same second group of electrodes and the front face of the back substrate on which said second group of electrodes is deposited, are removed. Thus, the electrodes will not contrast with the rest of the display surface of the device according to the invention, so that these electrodes will be totally invisible to the observer. On the other hand, since the second group of electrodes plays both the role of electrode for supplying control voltages switching the liquid crystal from a reflective state to a transparent state and vice versa, and the role of absorbent black layer, the manufacturing step which consists in selectively depositing the absorbent black layer after the deposition and structuring of the electrodes no longer requires any great precision, which, of course, has a favourable impact on the manufacturing costs of the display devices according to the invention.

According to a second aspect, the present invention concerns a liquid crystal display device including a substrate arranged on a front side, i.e. on the side receiving an incident light, and a layer arranged on a back side, so that this layer extends facing the front substrate parallel thereto, the front substrate and the layer carrying on their opposite faces a first and second group of electrodes respectively, a film formed by a plurality of liquid crystal capsules or by a polymer dispersed liquid crystal being arranged between said front substrate and said layer, characterised in that the layer is a black-coloured absorbent layer made of an electrically non-conductive material, and in that the second group of electrodes is made of an electrically conductive material which is also black, the reflection coefficient of the material used to elaborate the absorbent black layer being close or equal to that of the material used to elaborate the electrodes.

Other features and advantages of the present invention will appear more clearly upon reading the following detailed description of various embodiment examples of the display device according to the invention, these examples being given purely by way of non-limiting illustration, with reference to the annexed drawings, in which:

DETAILED DESCRIPTION OF THE INVENTION DRAWINGS

The present invention proceeds from the general idea consisting in moving, in the reflective liquid crystal display devices, the absorbent black layer which is usually deposited on the lower face of the back substrate, and arranging it at a higher level than the level of said back substrate. In this way, the number of parasite reflections of the incident light at the interfaces between two materials or mediums of different indices is reduced, which allows the display contrast to be significantly improved. Moreover, in the mass batch manufacturing process of the cells, one is no longer obliged to deposit the absorbent black layers selectively along the contour of the display cells, which allows the manufacture of these cells to be simplified and the cost price thereof to be reduced.

In the following description, those elements which are identical to those described previously with reference to FIG. 1 will be designated by the same reference numerals.

Figure 2:
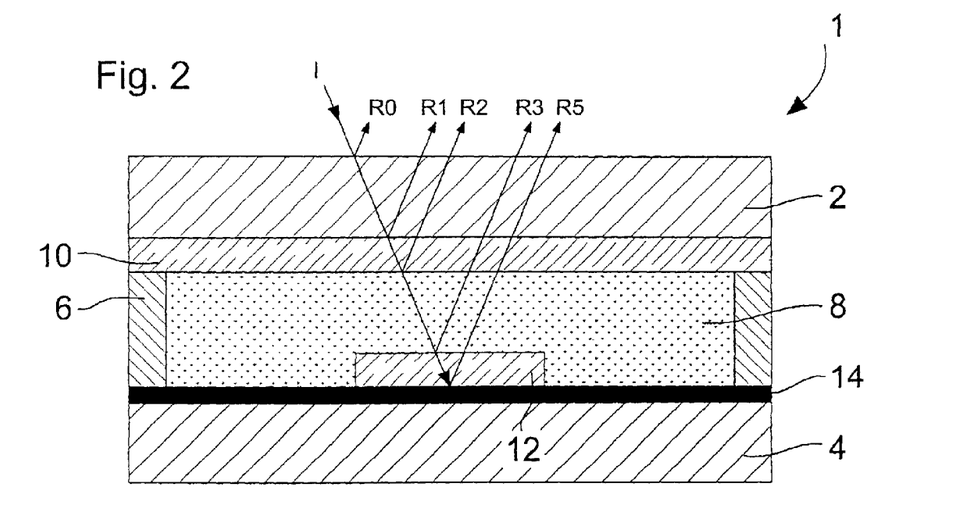
FIG. 2 is a cross-section of a display device according to a first aspect of the invention wherein the absorbent black layer made of an electrically non-conductive material is deposited between the second group of electrodes and the back substrate.

FIG. 2 is a cross-section of a display device 1 according to a first embodiment of the present invention. It will be recalled that such a display device 1 is formed of a front substrate 2 arranged on the side on which the light penetrates, and a back substrate 4 which extends facing front substrate 2 and parallel thereto. The two front and back substrates 2 and 4 are connected by a sealing frame 6 which delimits between them a cavity for containing a film or layer 8 of reflective liquid crystal. The surface of front substrate 2 turned towards back substrate 4 carries a first group of electrodes 10, and the surface of back substrate 4 turned towards front substrate 2 carries a second group of electrodes 12.

With respect to the embodiment of the prior art shown in FIG. 1, it will be observed that, in accordance with the present invention, the absorbent black layer 14 is non longer located on the bottom face of back substrate 4, but at a higher level than the latter in the stacking order of substrates 2 and 4, if the lower face of back substrate 4 facing the face of this same substrate 4 which carries the second group of electrodes 12 is considered the lowest level. More specifically, black absorbant layer 14 is arranged between back substrate 4 and second group of electrodes. Adopting the same terminology as that employed in FIG. 1 for the incident light reflections at the interfaces between two materials of different optical indices, it will be observed that reflection R4 at the interface between the second group of electrodes 12 and the front face of back substrate 4 has disappeared. This is due, of course, to the fact that absorbent black layer 14 has been deposited on the front surface of back substrate 4, and that the group of electrodes 12 has been formed and structured on said absorbent black layer 14. It can be demonstrated very simply by calculation that the removal of reflection R4, causing a drop in reflectivity r of display device 1 when liquid crystal 8 is switched into the state in which it is substantially transparent, causes an increase in display contrast CR. Moreover, since absorbent black layer 14 is non longer applied onto the back face of one of the plates common to all the display cells when they are batch manufactured, one is no longer obliged to deposit this absorbent black layer 14 selectively respecting the contour of each cell, which allows the manufacturing process to be considerably simplified and thus the cost price of said cells to be reduced.

Figure 3:
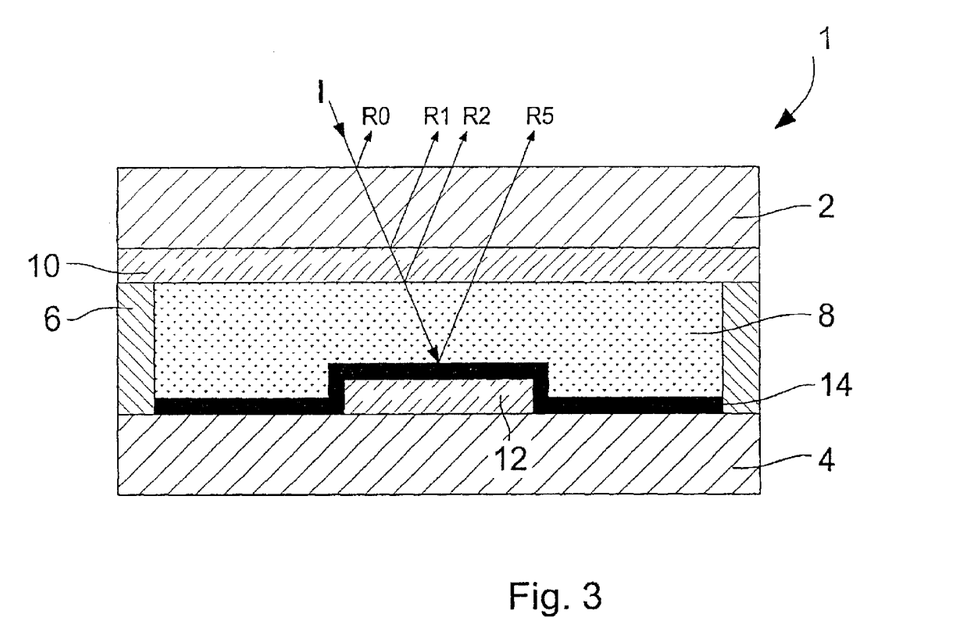
FIG. 3 is a cross-section of a display device according to the invention wherein the absorbent black layer made of an electrically non-conductive material is deposited on the second group of electrodes.

In FIG. 3, absorbent black layer 14 is deposited on the second group of electrodes 12. This second alternative embodiment of display device 1 according to the invention allows reflections R3 and R4 to be removed and is thus even more favourable from the point of view of display contrast CR than the embodiment shown in FIG. 2. Indeed, the drop in reflectivity r of display device 1 when the liquid crystal is in the transparent state is greater, which generates a still more significant increase in display contrast CR.

Figure 4:
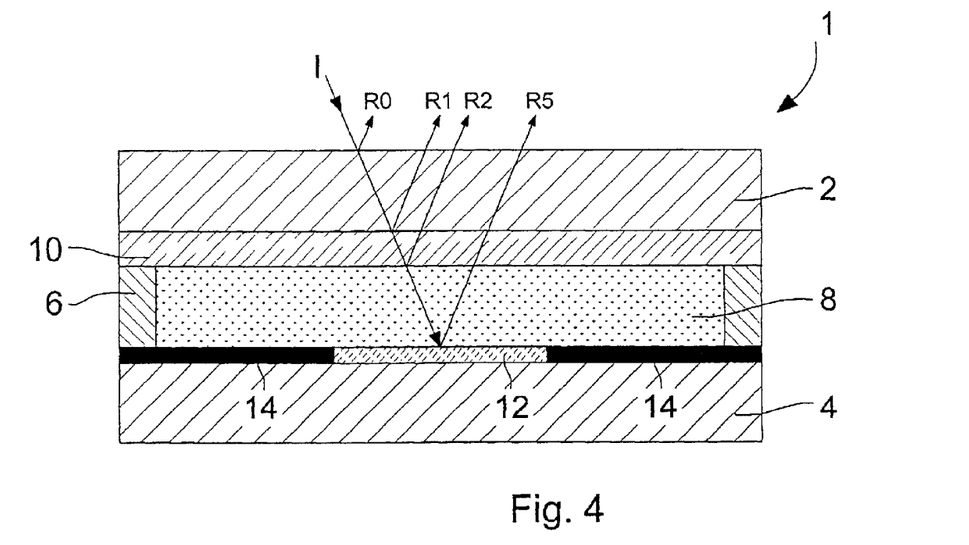
FIG. 4 is a cross-section of a display device according to the invention wherein the second group of electrodes carried by the back substrate is made of a black electrically non-conductive material and is associated with an absorbent black layer which covers the parts of the back substrate which are not covered by said second electrodes and which is made of an electrically non-conductive material whose reflection coefficient is equal or close to that of the material used to structure the electrodes.

FIG. 4 is a cross-section in a display device 1 according to the invention wherein the second group of electrodes 12 carried by back substrate 4 is made of a black electrically conductive material and is associated with an absorbent insulating layer 14 which is also black and which covers at least the parts of the back substrate which are not covered by electrodes 12.

In the example shown in FIG. 4, it can be seen that absorbent black layer 14 only covers the zones of back substrate 4 which are not covered by electrodes 12. Absorbent black layer 14 is made of an electrically non conductive material whose reflection coefficient is close or equal to that of the material used to elaborate black electrodes 12.

From the point of view of improving the contrast, this embodiment is as advantageous as that shown in FIG. 3. it allows reflections R3 and R4 to be removed which correspond, respectively, to the reflection of incident light at the interface between liquid crystal layer 8 and the second group of electrodes 12, and to the reflection of incident light at the interface between said second group of electrodes 12 and the front face of back substrate 4. Consequently, the reflectivity coefficient r decreases, which causes an increase in display contrast CR. However, compared to the embodiment of FIG. 3, the embodiment shown in FIG. 4 has the advantage that no voltage drop is observed due to the presence of black layer 14 between electrodes 12 and liquid crystal layer 8. This voltage drop in fact requires a higher control voltage for electrodes 10 and 12, which evidently leads to increased electric power consumption, and means that absorbent black layer 14 must have a constant a thickness as possible in order to be able to keep the control voltage at a uniform value for all the electrodes of the display device. Printing techniques must therefore be used which allow rigorous checking of the thickness of absorbent black layer 14, which has the effect of increasing the display device's manufacturing costs. However, in the case of the display device of FIG. 4, the thickness of absorbent black layer 14 plays a less important role, which allows simpler and thus less expensive printing techniques to be used.

It will further be noted that, since the reflection coefficient of the material used to make absorbent black layer 14 is substantially equal to that of black electrodes 12, the quantity of light R5 reflected by said electrodes 12 and by said absorbent layer 14 is identical. Consequently, in the zones where liquid crystal 8 is switched into a same transparent or reflective state, the light will be absorbed in an almost identical manner by black layer 14 and by black electrodes 12, and thus will provide a high-contrast display with a very homogenous colour over the entire surface of said display device 1. The electrodes will not therefore be able to contrast visually with the rest of the display surface of the device according to the invention, so that these electrodes will be totally invisible to the observer.

Figure 5:
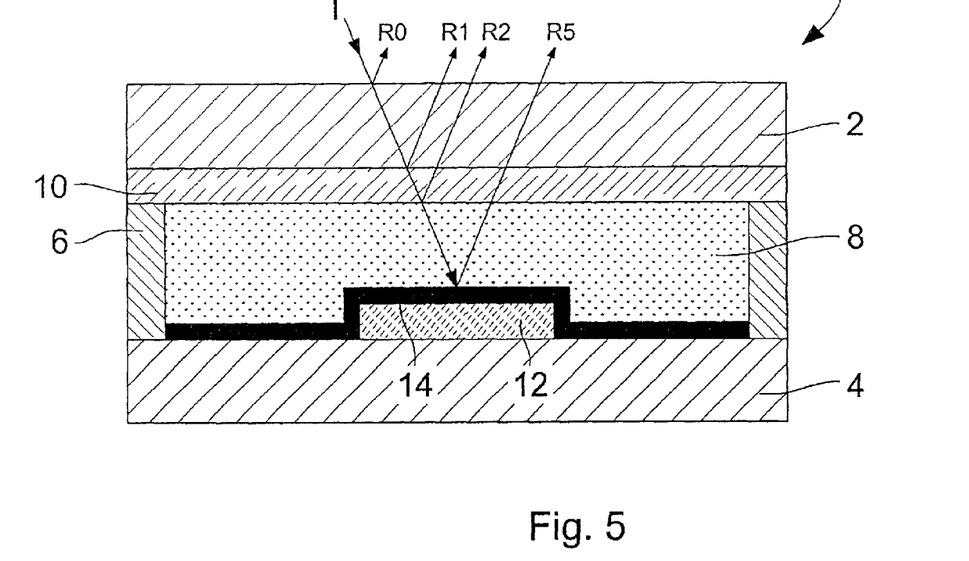
FIG. 5 is a cross-section of a display device according to the invention wherein the second group of electrodes carried by the back substrate is made of a black electrically conductive material and is covered by an absorbent black layer made of an electrically non-conductive material.

FIG. 5 is a cross-section of a display device 1 according to the invention wherein the second group of electrodes 12 carried by back substrate 4 is made of a black-coloured electrically conductive material and is covered by absorbent black layer 14. From the point of view of optical losses, this embodiment is as advantageous as that illustrated in FIG. 4 but it is simpler to make. Indeed, instead of absorbent black layer 14 covering only the parts of back substrate 4 which are not covered by black electrodes 12, it covers the entirety of the surface of said back substrate 4. The deposition of absorbent black layer 14 is thus greatly simplified and requires less precision, which allows substantial savings to be made in terms of manufacturing time.

Figure 6:
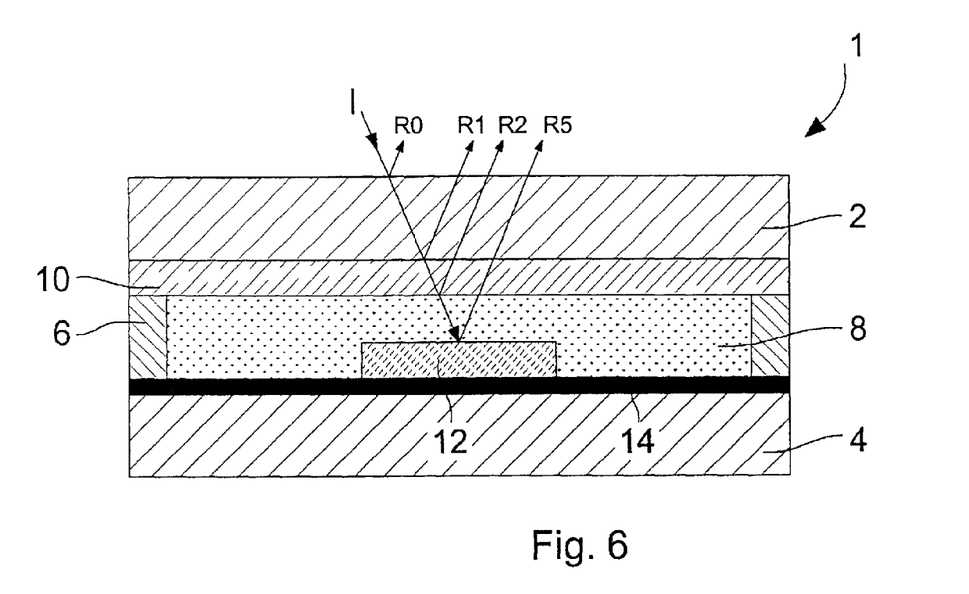
FIG. 6 is a cross-section of a display device according to the invention, wherein the absorbent black layer made of an electrically non-conductive material is arranged between the back substrate and the second group of electrodes made of a black electrically conductive material.

FIG. 6 is a cross-section of a display device 1 according to the invention wherein absorbent black layer 14 is arranged between back substrate 4 and the second group of electrodes 12 made of a black-coloured electrically conductive material. From the point of view of optical losses and from the manufacturing point of view, this embodiment is as advantageous as that illustrated in FIG. 5. Indeed, absorbent black layer 14 covers the whole surface of back substrate 4 and can thus be deposited without requiring any particular care. Moreover, since the reflection coefficient of absorbent layer 14 is close or equal to that of black electrodes 12, the quantity of light reflected by said layer 14 and by said electrodes 12 will be substantially the same, so that a very homogenous display will be obtained over the whole of the surface of display device 1.

Figure 7:
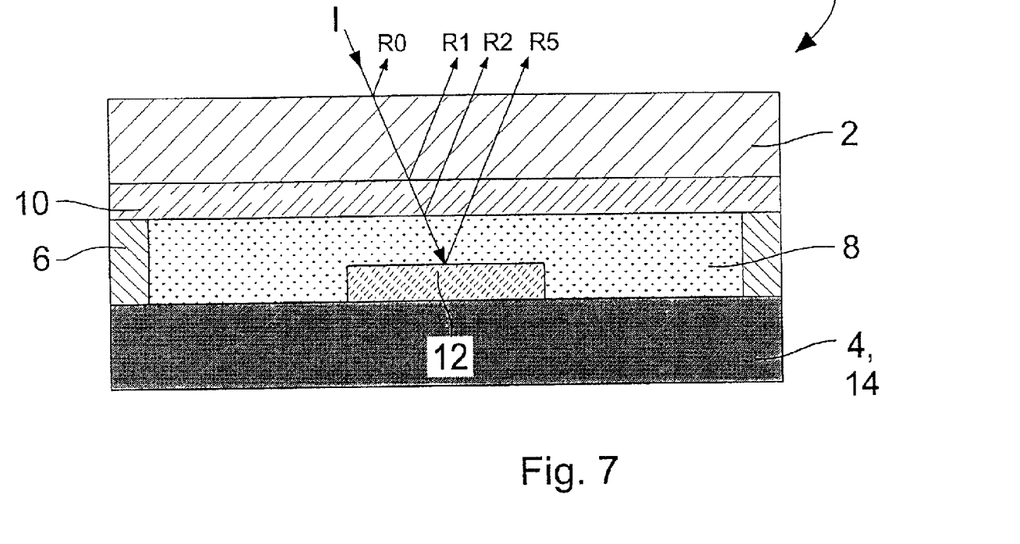
FIG. 7 is a cross-section of a display device according to the invention wherein the absorbent black layer made of an electrically non-conductive material is made in a single piece with the back substrate.

FIG. 7 is a cross-section in a display device 1 according to the invention wherein the absorbent black layer 14 is made in a single piece with back substrate 4. Back substrate 4 is thus made of glass or a plastic material coloured in black in the volume. This embodiment of display device 1 according to the invention is as advantageous, from the point of view of optical efficiency, as the embodiments illustrated in FIGS. 5 and 6. However, it has an additional advantage in that, since back substrate 4 plays both the role of electrode support and that of the absorbent black layer, the deposition step of said absorbent layer is omitted, which saves manufacturing time and thus reduces the cost price of display device 1.

According to a second aspect, the present invention concerns (see FIG. 8) a liquid crystal display device 1 including a transparent substrate 16 arranged on a front side, i.e. on the side receiving an incident light, and a layer 18 arranged on a back side, so that this layer 18 extends facing substrate 16 parallel thereto. Layer 18 plays the role taken by the previously described back substrate 4. Front substrate 16 and layer 18 carry on their opposite faces a first group of transparent electrodes 20 and a second group of electrodes 22 respectively. Electrodes 20 and 22 may be arranged, for example, in the shape of strips which are perpendicular to each other. A film 24S formed by a plurality of liquid crystal capsules or by a polymer dispersed liquid crystal is arranged between front substrate 16 and layer 18.

Figure 8:
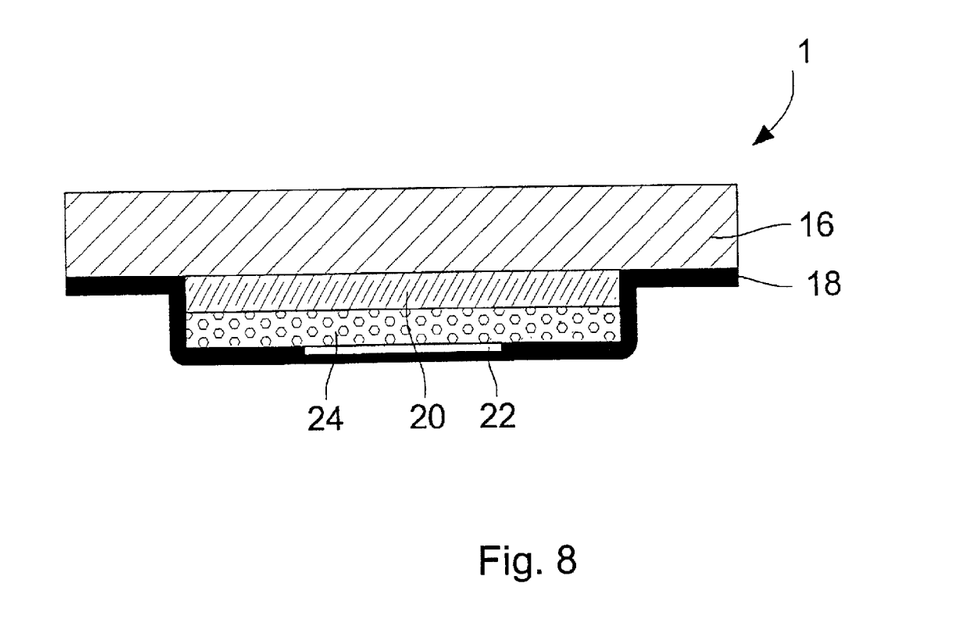
FIG. 8 is a cross-section of a display device according to a second aspect of the invention wherein a film formed by a plurality of liquid crystal capsules or by a polymer dispersed liquid crystal is arranged between a front substrate and an absorbent black layer made of an electrically non-conductive material.

In accordance with a feature of the invention, layer 18 is a black-coloured absorbent layer made of an electrically non-conductive material, while the second group of electrodes 22 is made of an electrically conductive material also black in colour. The reflection coefficient of the material used to elaborate absorbent black layer 18 is close or equal to that of the material used to structure electrodes 22.

As a result of these features, one omits back substrate 4 which is conventionally made of a rigid material such as glass or a semi-rigid material such as a plastic material, and it is replaced by the absorbent black layer 18 which can be deposited by all sorts of methods such as printing, evaporation or others directly onto black electrodes 22. Manufacturing gains are thus achieved which have a favourable impact on the cost price of the finished product.

In accordance with the invention, the black-coloured electrically conductive material used to make the second group of electrodes may be, as desired, an adhesive or a black varnish charged with conductive particles such as carbon particles. As regards the black adhesive, this may include a resin and a hardening agent, one of these two components being charged with the conductive particles. One could advantageously use the product marketed under the name Carbon Light Lack SD 2841 by the Lack Verke GmbH company.

As regards the deposition of the absorbent black layer, one can use silk-screen printing, tampo printing, flexographic printing or vapour deposition of said black layer. This absorbent layer may be made, for example, of a black-coloured insulating lacquer such as that marketed under the name Heatsinkpaste HSP 2741 by the Lack Verke GmbH company.

As will have been understood from the foregoing, the present invention implements intrinsically reflective liquid crystals, i.e. reflecting light without using reflectors in a first switching state, and being substantially transparent to light in a second switching state. Among these liquid crystals, one may of course cite cholesteric texture crystals, but also the liquid crystal/polymer structures formed by holography or certain polymer dispersed liquid crystals or "PLDC".

It goes without saying that the invention is not limited to the embodiments which have just been described, and that modifications and variants may be envisaged without departing from the scope of the present invention.

What is claimed is:

1. A reflective liquid crystal display device including a first substrate arranged on a front side, i.e. arranged on the side receiving an incident light, and a second substrate arranged on a back side, so that this second substrate extends facing the front substrate parallel thereto, the first and second substrates being connected via a sealing frame in order to delimit between them a cavity for containing liquid crystal and including on their opposite faces a first and a second group of electrodes respectively, the display device being connected to a control circuit supplying suitable control voltages to selected electrodes in order to modify the optical conditions of the liquid crystal into a reflective state or into a transparent state, said display device further including an absorbent black layer made of an electrically non-conductive material, wherein the absorbent black layer is arranged either at the surface of the second substrate or on the second group of electrodes that is formed on the second substrate, wherein the second group of electrodes is made of a black-coloured electrically conductive material, and is associated with the absorbent layer which is also black and made of a electrically non-conductive material whose reflection coefficient is close or equal to that of the material used to elaborate the electrodes, this layer covering at least the parts not covered by the electrodes, so that, in the zones where the liquid crystal is switched into a transparent or reflective state, the light can be absorbed either by the absorbent black layer or by the second group of electrodes and provides a high-contrast display of homogenous colour over the entire surface of said display device.

2. The display device according to claim 1, wherein the absorbent black layer is arranged between the second substrate and the second group of electrodes.

3. The display device according to claim 1, wherein the absorbent black layer is deposited on the second group of electrodes.

4. The display device according to claim 1, wherein the second group of electrodes is carried by the second substrate, the parts of said second substrate which are not covered by said electrodes being covered by the absorbent black layer.

5. The display device according to claim 1, wherein the second group of electrodes is carried by the second substrate, the absorbent black layer being deposited on said second group of electrodes.

6. The display device according to claim 1, wherein the absorbent black layer is arranged between the second substrate and the second group of electrodes.

7. The display device according to claim 1, wherein the absorbent black layer is made in a single piece with the second substrate.

8. The display device according to claim 7, wherein the second substrate is made of glass or a plastic material coloured in black in the volume.

9. The display device according to claim 1, wherein the electrically conductive material is a black varnish charged with conductive particles.

10. The display device according to claim 9, wherein the conductive particles are carbon particles.

11. The display device according to claim 1, wherein the electrically conductive material is a black adhesive charged with conductive particles.

12. The display device according to claim 11, wherein the conductive particles are carbon particles.

13. The display device according to claim 1, wherein the absorbent layer is made of a black-coloured insulating lacquer.

14. The display device according to claim 1, wherein the absorbent black layer is deposited by silk screen printing, tampo printing, flexographic printing or by vapour deposition.

15. The display device according to claim 1, wherein the liquid crystal is selected from the group consisting of cholesteric texture liquid crystals, liquid crystal/polymer structures formed by holography, and polymer dispersed liquid crystals.

16. A liquid crystal display device including a substrate arranged on a front side, i.e. on the side receiving an incident light, and a layer arranged on a back side, so that this layer extends facing the front substrate and parallel thereto, the front substrate and the layer carrying on their opposite faces a first and second group of electrodes respectively, a film formed by a plurality of liquid crystal capsules or by a polymer dispersed liquid crystal being arranged between said front substrate and said layer, wherein the layer is a black-coloured absorbent layer made of an electrically non-conductive material, and in that the second group of electrodes is made of an electrically conductive material which is also black, the reflection coefficient of the material used to elaborate the absorbent black layer being close or equal to that of the material used to elaborate the electrodes.

17. The display device according to claim 16, wherein the electrically conductive material is a black varnish charged with conductive particles.

18. The display device according to claim 16, wherein the electrically conductive material is a black adhesive charged with conductive particles.

19. A display device according to claim 18, wherein the conductive black adhesive includes a resin and a hardening agent, one of these two components being charged with conductive particles.

20. The display device according to claim 16, wherein the absorbent layer is made of a black-coloured insulating lacquer.

21. The display device according to of claim 16, wherein the absorbent black layer is deposited by silk screen printing, tampo printing, flexographic printing or by vapour deposition.

22. The display device according to claim 16, wherein the reflective liquid crystal is selected from the group formed by cholesteric texture liquid crystals, liquid crystal/polymer structures formed by holography, and polymer dispersed liquid crystals.

* * * * *